(12) United States Patent
Azuma et al.

(10) Patent No.: US 8,181,916 B2
(45) Date of Patent: May 22, 2012

(54) PIPE SUPPORT BASE

(75) Inventors: Masatoshi Azuma, Tokyo (JP); Atsushi Hikoyama, Tokyo (JP)

(73) Assignee: Advance Co., Ltd., Tokyo (JP)

( * ) Notice: Subject to any disclaimer, the term of this patent is extended or adjusted under 35 U.S.C. 154(b) by 366 days.

(21) Appl. No.: 12/507,606

(22) Filed: Jul. 22, 2009

(65) Prior Publication Data

US 2009/0272856 A1 Nov. 5, 2009

(51) Int. Cl.
*F16L 3/22* (2006.01)

(52) U.S. Cl. ............... 248/68.1; 248/74.1; 248/74.2; 248/346.01; 248/346.5; 52/480; 52/167.9

(58) Field of Classification Search ............ 248/74.2, 248/74.1, 68.1, 49, 346.01, 346.05; 52/480, 52/167.9

See application file for complete search history.

(56) References Cited

U.S. PATENT DOCUMENTS

| 5,172,097 | A | * | 12/1992 | Arnold | 340/543 |
| 5,217,191 | A | * | 6/1993 | Smith | 248/55 |
| 5,418,171 | A | * | 5/1995 | Kimura et al. | 436/518 |
| D367,839 | S | * | 3/1996 | Abbott et al. | D12/220 |
| 6,679,461 | B1 | * | 1/2004 | Hawkins | 248/74.2 |
| D548,063 | S | * | 8/2007 | Allen et al. | D8/377 |
| 7,922,130 | B2 | * | 4/2011 | Hawkins | 248/74.2 |

FOREIGN PATENT DOCUMENTS

JP 2002-130539 A 5/2002

* cited by examiner

*Primary Examiner* — Amy J Sterling
(74) *Attorney, Agent, or Firm* — Apex Juris, pllc; Tracy M. Heims

(57) ABSTRACT

To provide a pipe support base light in weight and with good workability, to which loads may given according to need. This problem may be overcome with a hollow cylindrical body with a rectangular cross section and with four sides. A through passage is provided in the center portion thereof. Further, a cross-shaped rib is provided at an approximately central position thereof. Additionally, grooves are formed parallel to the aforementioned through passage on at least any of the surfaces, upon the edges of which are provided engagement plates protruding into the cross sections of the grooves.

4 Claims, 3 Drawing Sheets

PIPE SUPPORT BASE

CROSS-REFERENCE TO RELATED APPLICATION(S) AND CLAIM OF PRIORITY

The present application claims the benefit under 35 U.S.C. section 119(a) of Japanese Design Applications filed in the Japan Patent Office on Mar. 12, 2007 and assigned serial number 2009-5526 and the Japan Patent Office on Mar. 12, 2007 and assigned serial number 2009-5527, the disclosures of which are incorporated herein by reference.

FIELD OF INVENTION

The present invention relates to a pipe support base, more particularly to a support base for mounting various types of piping thereon. Generally, the piping systems are generally installed on building roofs or the like for various utility purposes.

BACKGROUND OF THE INVENTION

Water supply tanks are arranged with cooling-heating devices on building roofs. In order to supply water and/or gas to the inside of a building from such tanks and devices, piping must be installed upon the roofs of these buildings.

This piping needs to lifted a predetermined distance up from the surface of a roof a and is not fixed directly to the roof out of consideration for waterproofing. Therefore, conventionally, wood blocks, concrete blocks, or steel columns have been used to function as a mounting structure to lift the piping to sit thereon.

[Patent Document 1] Japanese Unexamined Patent Application No. 2002-130539

Wood block pipe support base is an easy and inexpensive way to achieve the above-goal; however, wind, rain, and sunlight cause the wood to corrode and the bolts to be lost, thereby potentially causing the piping to lose its fixture to the wooden base. Obviously, the piping structure needs to last for a long time to but the wood block pipe support base has this endurance issue. Concrete may be mixed to fill the interior of mold forms; however, this takes time and efforts. There are also certain methods in which pipe mountings are constructed together with roof waterproofing as a single unit. With such methods, renovation of roof waterproofing requires cumbersome work such as spreading out sheets of material and covering the periphery of the mounting and, further, this waterproofing may be incomplete as a result.

SUMMARY OF THE INVENTION

In order to solve the above-described problems, the pipe support base of the present invention is a pipe support base that is a hollow cylindrical body with a rectangular cross section and with four sides, provided with a through passage penetrating the inner portion of the aforementioned hollow cylindrical body, a cross-shaped rib positioned at an approximately central portion, grooves formed parallel to the aforementioned through passage on at least any of the surfaces, and engagement plates provided on the edges of the aforementioned grooves and protruding into the cross sections of the aforementioned grooves.

The pipe support base is a hollow cylindrical body and, as such, is light in weight and allows for easy handling, thus minimizing construction costs. The support base is only installed to the surface of a roof, thus obviating work such as rooftop surface processing and, as a result, completely preventing damage to roof waterproofing. With buildings, renovation of roof waterproofing is required at a certain point in time after construction is complete. Even upon renovation, the support base of the present invention does not require roof surface processing as it is simply placed on the surface of a roof. As such, the support base can be easily moved or removed without interfering with waterproofing. By forming a plurality of grooves on a single support base, grooves conforming to commercially-available pipe fastener specifications can be selected from this plurality of grooves and the corresponding surface can be used by facing it upward. As such, a variety of types of fasteners can be made to correspond with a single support base, making the inventive pipe support base very economical.

BRIEF DESCRIPTION OF THE DRAWINGS

The above and other objects of the present invention will become readily apparent by reference to the following detailed description when considered in conjunction with the accompanying drawings wherein.

DETAILED DESCRIPTION OF THE PREFERRED EMBODIMENT

Embodiments of the present invention will be explained with reference to the drawings. Significant components of the present invention will be explained hereinafter.

Figure 1:
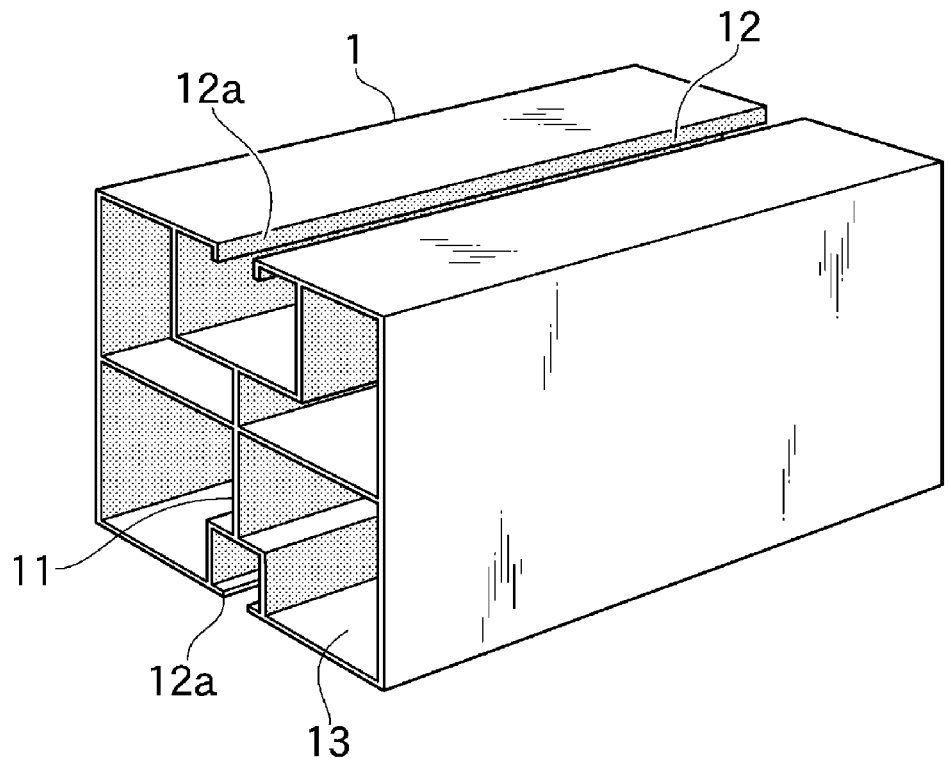
FIG. 1 is an explanatory view of the pipe support base of the embodiment of the present invention.
Figure 2:
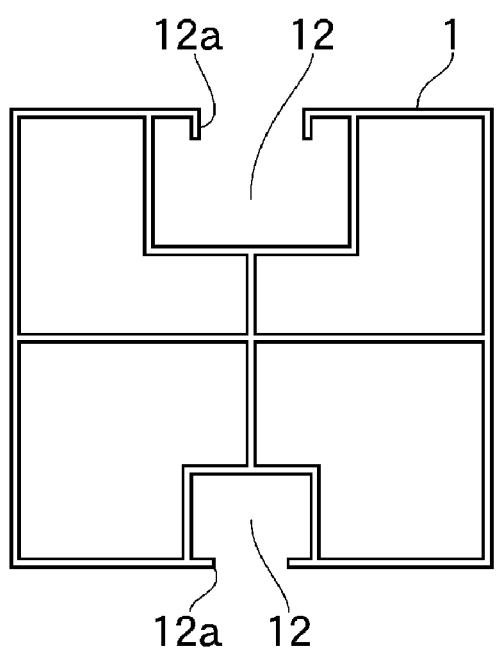
FIG. 2 is a longitudinal cross section view of the pipe support base.
Figure 3:
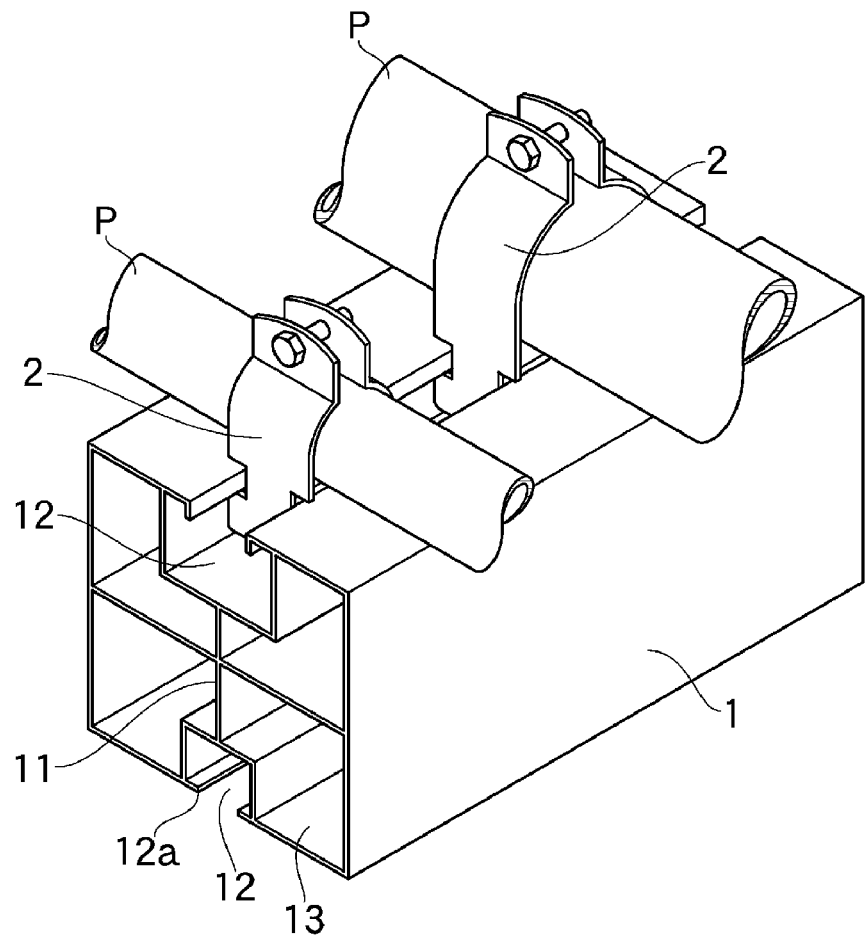
FIG. 3 is an explanatory view of piping being supported by the pipe support base.

FIG. 1 is an explanatory view of the pipe support base of the embodiment of the present invention. FIG. 2 is a longitudinal cross section view of the pipe support base. FIG. 3 is an explanatory view of piping being supported by the pipe support base.

The basic shape of a pipe support base 1, which supports a pipe P, is a cross section enclosed by a rectangular hollow cylindrical body. This cylindrical body material is a lightweight material constituted of a synthetic such as ABS resin or AES resin or constituted of thin steel plates. A cross-shaped rib 11 is provided in the approximate center of the cylindrical body. As a result, a plurality of penetrating passages are formed in the interior of the cylindrical body.

A groove 12 is formed parallel to a through passage 1, which may be formed on any surface of the rectangular cylindrical body, thereby constituting pipe support base 1. An engagement plate 12a projecting in an eave shape toward the inside the cross section of groove 12 is then formed on the edge of groove 12. This engagement plate 12a is mounted by means of a pipe fastener 2 described below. The engagement plate 12a may be a simple eave-shaped plate, or it may be an L-shaped member with a cross section bending toward the interior. In the case that groove 12 is formed in a plurality of areas on support base 1, the dimensions of the grooves are made consistent with the specifications of a variety of later explained different commercially-available pipe fasteners 2. By doing so, grooves conforming to pipe fastener 2 specifications can be selected from a plurality of grooves 12 in a single support base 1 and the corresponding surface can be used by facing it upward. As such, a variety of types of fasteners can be made to correspond with a single support base, making the inventive pipe support base very economical.

The pipe P is fastened to support base 1 of the present invention by means of a pipe fastener 2. This pipe fastener 2 is a product which is already available commercially and is constituted by a combination of two semicircular plates or by a bolt. As shown in the drawings, the semicircular plates are rectangular thin plates partially formed with curved portions. Then, when these two semicircular plates are combined to sandwich the pipe P, the curved portions thereof are brought into contact with the upper portion of the pipe P. When these two semicircular plates are in the combined position, the portions of the semicircular plates above the curved portions are brought closer together than the portions below the curved portions, and these proximal portions are fastened together by a bolt placed through these two proximal portions.

Figure 4:
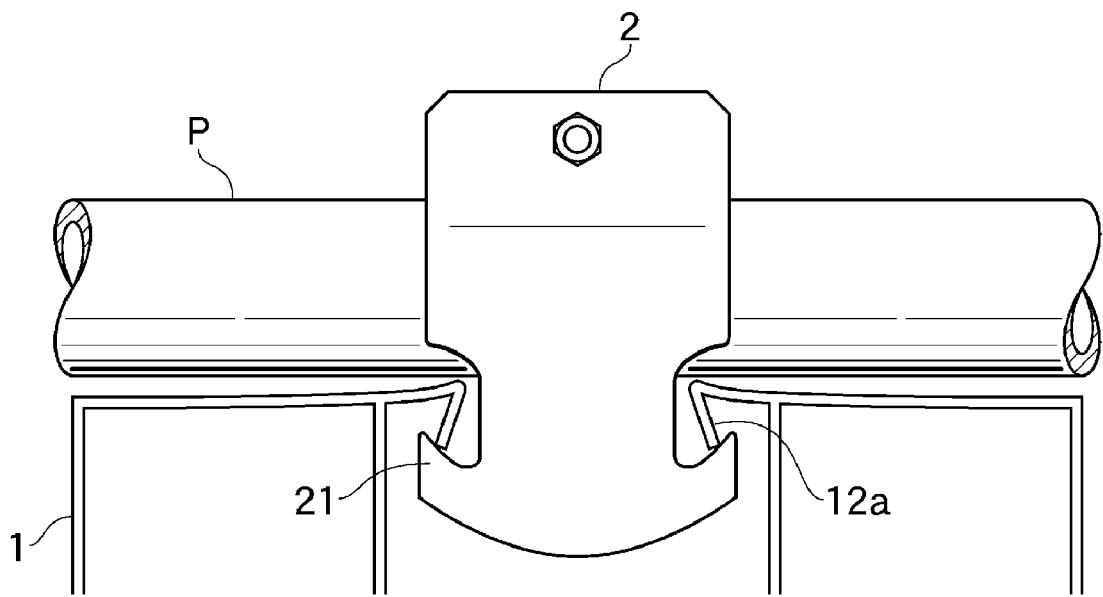
FIG. 4 is an explanatory view of piping being supported as per another embodiment.

FIG. 4 is an explanatory view of piping being supported as per another embodiment. The cross-sectional width of groove 12 is consistent with the dimensions of commercially-available pipe fastener 2. In the case that pipe fastener 2 is a semicircular plate with certain specifications, the width of the portion above its curved portion is constituted to be wider than the width of groove 12. The width of the portion below the curved portion is constituted to be narrower than the width of groove 12. The lowermost part is formed with a part expanding toward the side surface, the upper end of both ends of this expanding part protruding upwards to form hooks 21. These hooks 21 engage with the inside of engagement plate 12a which protrudes inwardly from both sides of groove 12.

Figure 5:
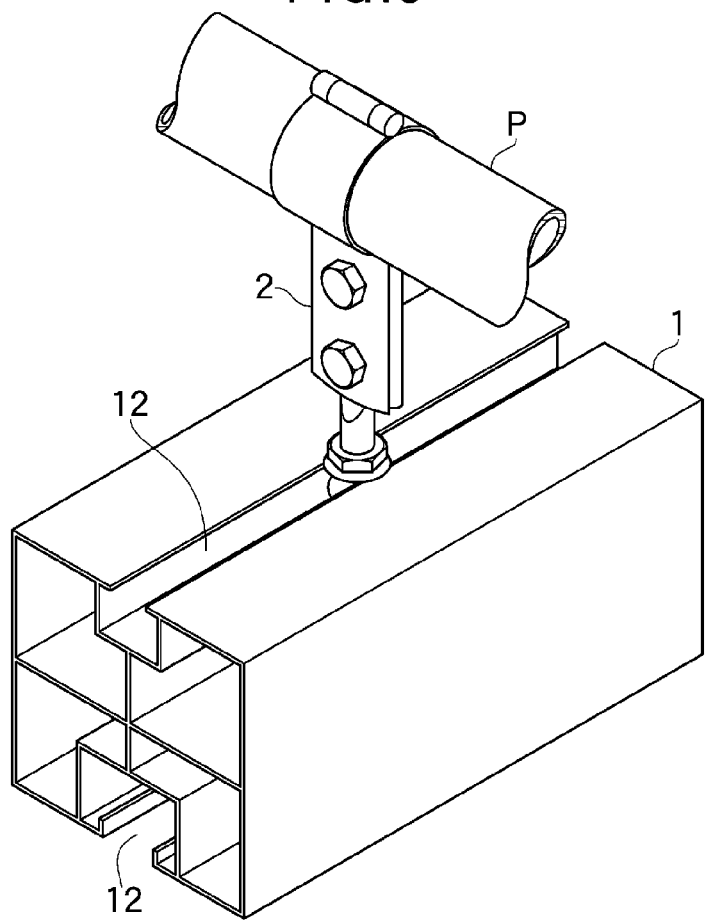
FIG. 5 is an explanatory view of piping being supported as per another embodiment.
Figure 6:
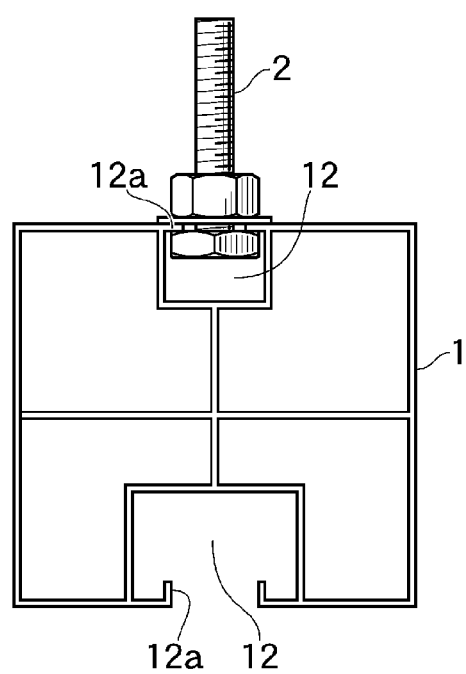
FIG. 6 is a partial cross section view of FIG. 5.

FIG. 5 is an explanatory view of piping being supported as per another embodiment; and FIG. 6 is a partial cross section view of FIG. 5. In the case that the pipe fastener 2 is a bolt, the width of groove 12 is constituted to be approximately equal to the width of a bolt head part with certain specifications. As such, when the bolt head part is slid from the open side of groove 12 to the interior thereof, this bolt head part will be restrained by both wall surfaces of both sides of groove 12, thus preventing rotation. Therefore, by making the widths of the plurality of the grooves 12 formed on the support base 1 of the present invention consistent with the specifications of various types of bolt head parts, the pipe P can be fixed through the use of various types of bolts. On the other hand, by making one of the plurality of the grooves 12 consistent with the specifications of a semicircular plate and then making another groove 12 consistent with the specification of a bolt, a plurality of the pipe fasteners 2 can be installed with a single support base 1.

While the embodiments of the present invention disclosed herein are presently considered to be preferred embodiments, various changes and modifications can be made without departing from the spirit and scope of the present invention. The scope of the invention is indicated in the appended claims, and all changes that come within the meaning and range of equivalents are intended to be embraced therein.

What we claim is:

1. A pipe support base, comprising:
    a hollow cylindrical body with a rectangular cross section and with four sides;
    a through passage that is penetrating an inner portion of said hollow cylindrical body;
    a cross-shaped rib that is positioned at an approximately central portion;
    grooves that are formed on facing surfaces, parallel to said through passage, are in different widths; and
    engagement plates provided on the edges of each grooves and protruding into the cross sections of said grooves.
2. The pipe support base according to claim 1, wherein said grooves are designed to match with sizes of standardized pipe fastener.
3. The pipe support base according to claim 1, wherein said pipe fastener is in a semicircular shape, which is capable of sliding along the through passage.
4. The pipe support base according to claim 1, wherein said pipe fastener is a bolt and a nut capable of sliding along the through passage and catching and sandwiching a top surface of the pipe support base.

\* \* \* \* \*